United States Patent
Auer et al.

(10) Patent No.: US 10,341,330 B2
(45) Date of Patent: Jul. 2, 2019

(54) 2FA AUTHENTICATION WITH QR ON HMD

(71) Applicant: GIESECKE & DEVRIENT GMBH, München (DE)

(72) Inventors: Martin Auer, Pfeffenhausen (DE); Torsten Leibner, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 31 days.

(21) Appl. No.: 15/022,648

(22) PCT Filed: Sep. 12, 2014

(86) PCT No.: PCT/EP2014/002476
§ 371 (c)(1),
(2) Date: Mar. 17, 2016

(87) PCT Pub. No.: WO2015/039739
PCT Pub. Date: Mar. 26, 2015

(65) Prior Publication Data
US 2016/0234194 A1    Aug. 11, 2016

(30) Foreign Application Priority Data
Sep. 17, 2013  (DE) .......... 10 2013 015 382

(51) Int. Cl.
| H04L 29/06 | (2006.01) |
| G06F 21/42 | (2013.01) |
| G06Q 20/42 | (2012.01) |
| G06Q 20/26 | (2012.01) |
| G02B 27/01 | (2006.01) |

(52) U.S. Cl.
CPC ............ H04L 63/083 (2013.01); G06F 21/42 (2013.01); G06Q 20/26 (2013.01); G06Q 20/425 (2013.01); H04L 63/08 (2013.01); H04L 63/10 (2013.01); H04L 63/18 (2013.01); G02B 27/017 (2013.01); G02B 2027/014 (2013.01); G02B 2027/0138 (2013.01); G02B 2027/0178 (2013.01)

(58) Field of Classification Search
CPC ............... H04L 63/083; H04L 63/0853; H04L 63/0876; G06F 21/35
USPC ........................................................ 726/1, 7
See application file for complete search history.

(56) References Cited

U.S. PATENT DOCUMENTS

| 8,511,547 B2 | 8/2013 | Rans et al. | |
| 8,677,116 B1 * | 3/2014 | Bicer | H04L 63/0838 713/155 |
| 2006/0115130 A1 * | 6/2006 | Kozlay | G02B 27/0093 382/117 |

(Continued)

OTHER PUBLICATIONS

Anonymous, "Glassauth Google Glass APP—2step Authentication for Google Accounts," URL: https://web.archive.org/web/20130509042225/http://glass-apps.org/glassauth-google-glass-app-2step-authentication-for-google-accounts, May 9, 2013, pp. 1-3, Retrieved on Nov. 10, 2014.

(Continued)

Primary Examiner — David J Pearson
(74) Attorney, Agent, or Firm — Workman Nydegger

(57) ABSTRACT

A method is provided for displaying confidential information, such as a cash-card secret code and/or a credit-card secret code. If the information transmitted to a service facility matches the information deposited there, the confidential information is displayed on a display device arranged on a user's head.

9 Claims, 2 Drawing Sheets

(56) References Cited

U.S. PATENT DOCUMENTS

| | | | | |
|---|---|---|---|---|
| 2007/0278291 | A1* | 12/2007 | Rans | G06Q 20/341 |
| | | | | 235/380 |
| 2010/0332841 | A1* | 12/2010 | Watts | G06F 21/36 |
| | | | | 713/182 |
| 2011/0153503 | A1* | 6/2011 | Blewett | G06Q 20/12 |
| | | | | 705/67 |
| 2011/0202984 | A1* | 8/2011 | Hird | G06F 21/31 |
| | | | | 726/7 |
| 2011/0210171 | A1* | 9/2011 | Brown | G06Q 20/3276 |
| | | | | 235/382 |
| 2012/0218188 | A1 | 8/2012 | Kashitani | |
| 2014/0026204 | A1* | 1/2014 | Buntinx | H04L 63/062 |
| | | | | 726/9 |
| 2014/0108260 | A1 | 4/2014 | Poole et al. | |
| 2014/0244464 | A1 | 8/2014 | Pinski | |
| 2014/0337634 | A1* | 11/2014 | Starner | H04L 9/3231 |
| | | | | 713/186 |
| 2014/0366099 | A1* | 12/2014 | Le Huerou | H04L 63/08 |
| | | | | 726/4 |

OTHER PUBLICATIONS

Anonymous, "Local Backup Codes—OTP Google Authenticator," URL: https://web.archive.org/web/20130705075656/http://support.google.com/accounts/answer/1187538, Jul. 5, 2013, pp. 1-3, Retrieved on Nov. 10, 2014.

International Search Report for corresponding International PCT Application PCT/EP2014/002476, dated Nov. 20, 2014.

Mandau, "The Best Online Bank," CHIP Online, Sep. 4, 2013, pp. 1-10, URL: http://www.chip.de/artikel/Online-Banking-Test_63471557.html ff.

Tandon et al., "QR Code Based Secure OTP Distribution Scheme for Authentication in Net-Banking," International Journal of Engineering Technology (IJET), Jun.-Jul. 2013, pp. 2502-2505, vol. 5, No. 3.

German Examination Report for corresponding German Application 10 2013 015 382.4, dated May 7, 2014.

* cited by examiner

2FA AUTHENTICATION WITH QR ON HMD

TECHNICAL FIELD

The present invention concerns a method for displaying confidential information with a display device arranged on a head. A display device arranged on the head is also known under the term "head-mounted display". The display device is worn before a user's eye electively integrated into conventional eyeglasses or merely mounted on a frame and can represent any kind of information.

PRIOR ART

It is known that when a new credit card or a new cash card is applied for, the appurtenant secret code/PIN is transmitted in a separate letter. This method has the disadvantage that a further letter must be sent in addition to the credit card. As a result, additional costs are incurred and there is the risk of the letter with the PIN being intercepted by an unauthorized third party.

Further, the so-called ePIN method is known wherein the PIN is communicated to a card owner by short message service (SMS). This method has the disadvantage that sending short messages also incurs costs and there is additionally the danger of a third party standing nearby also reading a PIN represented on the display device of a mobile radio device, in order to subsequently misuse the PIN.

STATEMENT OF INVENTION

It is an object of the present invention to solve the above-mentioned disadvantages in transferring PINs and further to provide a method for displaying confidential information that enables confidential information to be transferred and represented securely and so as to be protected from access by third parties.

The object is achieved by a method for displaying confidential information according to the independent claim 11 and by the use of a display device arranged on a user's head according to the independent claim 11. Advantageous embodiments of the method according to the invention and of the use according to the invention can be found in the subclaims.

The invention is based on the idea of using a certain display device associated with a service facility and arranged on a user's head for representing confidential information on said display device.

According to the invention, the method for displaying the confidential information comprises supplying a service facility, supplying authentication information to a user, reading in the authentication information with a recording unit of a display device arranged on a user's head or a recording unit of a mobile radio device, transmitting identification information associated with the display device or the mobile radio device and the read-in authentication information to a service facility via an over-the-air interface, with the identification information being known to the service facility before the authentication information is supplied, and displaying the confidential information on a display device arranged on the user's head.

With the method according to the invention it is especially advantageously possible to ensure that a service facility transmits information to a display device only when the service facility has knowledge of the identification information associated with the display device or the mobile radio device, on the one hand, and the identification information and authentication information supplied to the user are transmitted to the service facility, on the other hand. In this way, security is greatly increased since, firstly, the user must be in possession of the authentication information and, secondly, the confidential information is only transmitted to the display device when the authentication information and the identification information are transmitted with a certain display device or by a certain mobile radio device. In other words, it is necessary to send certain identification information associated with the display device or the mobile radio device to the service facility via the over-the-air interface. Unauthorized third parties are thus substantially impeded from obtaining illegal access to the confidential information.

According to one embodiment, the confidential information is an access password and/or a secret code, in particular, a cash-card secret code and/or a credit-card secret code. Therefore, the method according to the invention provides a particularly secure and simple way of transferring said confidential information.

According to a further preferred embodiment, the authentication information is supplied electronically, for example by e-mail, and/or by mail. The authentication information may be a multi-digit number and/or an optoelectronically readable code, such as a bar code and/or a 2D bar code. Both the multi-digit number and the optoelectronically readable code can be read in and recognized reliably and without error with the recording unit of the display device arranged on the head or with the recording unit of the mobile radio device.

According to a further embodiment, the recording unit can be configured as a camera device or as a video camera device. The recording unit can be configured on a frame of the display device arranged on the head.

The identification information associated with the display device or the mobile radio device may be information negotiated with the service facility, i.e. it may be information that is stated for example upon ordering of the cash card. Ordering of the cash card can be effected for example at the financial institution or on the web page of the financial institution. Said information can describe an object, such as a chair, or an animal, such as a duck. Alternatively, the identification information associated with the display device or the mobile radio device may be a mobile telephone number associated with the display device or the mobile radio device, in particular an MSISDN. The mobile telephone number can be associated with the display device directly, i.e. the display device has located therein a mobile radio unit, so that the display device arranged on the head can also be used as a mobile radio telephone through provision of suitable devices, such as at least a microphone and a loudspeaker/headset. Alternatively, the mobile telephone number can be associated with the display device indirectly, by the display device arranged on the head being coupled with a mobile radio device. Coupling the display device and the mobile radio device can be effected for example via Bluetooth, infrared, wireless LAN and/or any other radio standard.

According to a further embodiment, the service facility may be a mobile network operator (MNO), a financial institution and/or a credit-card company. In case it is a financial institution and/or a credit-card company, the transmitted identification information as well as the transmitted and read-in authentication information are to be supplied thereto by the mobile network operator using suitable data transfer methods.

The security upon displaying the confidential information on the display device arranged on the user's head can be improved further by the display device ascertaining, before displaying the confidential information, whether it is arranged on a user's head, so that the user can see the display device.

The method according to the invention is especially advantageously suited for use with a display device arranged on a user's head. In this way it is made possible to represent sensitive data especially securely only for the wearer of the display device.

BRIEF DESCRIPTION OF DRAWINGS

Hereinafter the invention will be explained more closely with reference to an embodiment represented in the drawings. There are shown.

DETAILED DESCRIPTION OF PREFERRED EMBODIMENTS OF INVENTION

Hereinafter the method according to the invention for displaying confidential information will be described on the basis of an exemplary embodiment with reference to FIGS. 1 to 3.

The confidential information is for example an access password (PIN) and/or a secret code, in particular a cash-card secret code and/or a credit-card secret code.

Figure 1:
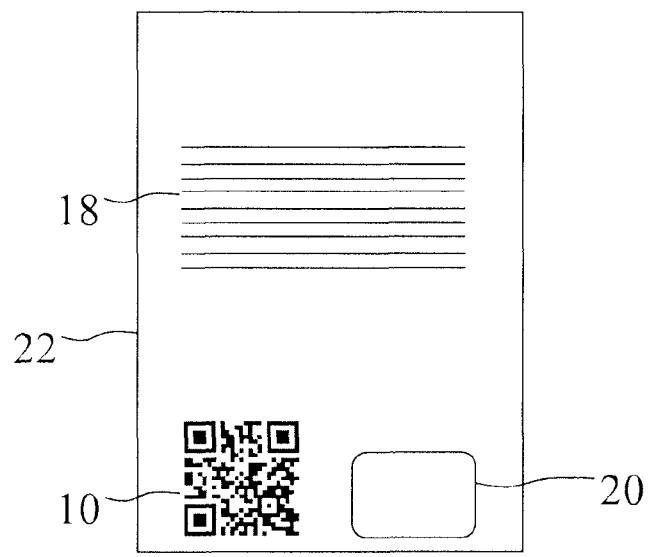
FIG. 1 a letter containing a new cash card and authentication information.
Figure 2:
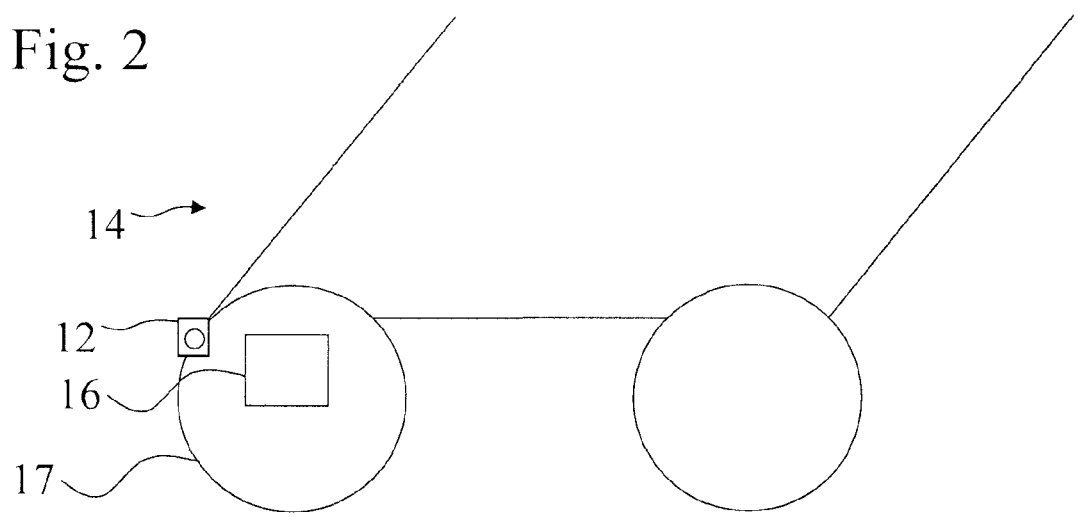
FIG. 2 a simplified representation of a display device arranged on the user's head, and FIG. 3 a sequence of a method according to the invention.

FIG. 1 shows a letter 22 with which a financial institution sends a cash card, a debit card and/or a credit card 20 to a user who has ordered a new card 20. Besides the actual correspondence 18, which for example describes how to deal with the cash card 20, the letter also has the cash card 20 detachably bonded thereto. In addition to the correspondence 18 and the cash card 20, the letter 22 also has authentication information 10 imprinted thereon. In the shown embodiment example, the authentication information 10 is embodied by a 2D bar code. Alternatively, the authentication information 10 can also be embodied by a multi-digit number and/or an optoelectronically readable code. The only condition is that the authentication information 10 can be read in and processed by means of a recording unit 12, such as a camera device (see FIG. 2).

In the method according to the invention, after receiving the cash card 20, in particular the credit card, the user reads in the authentication information 10 with the recording unit 12 of a display device 16 arranged on his head. The display device 16 arranged on his head is for example a frame 14 which is worn on the head like eyeglasses and has a display device 16. Such devices 14, 16 are also designated head-mounted displays (HMD). They have a substantially transparent display device 16 through which the user can see when wearing the frame 14 and the display device 16. On the display device 16 it is possible to represent information such that it is perceived against the background that the wearer of the display device 16 would perceive with his eyes if not wearing the display device 16. For eyeglass wearers, the display device 16 can be attached before or behind the actual eyeglass lens such that the eyeglass wearer is able to recognize the display device 16 in dependence on his impaired vision. For users without defective vision, there can be used a frame 14 that does without eyeglass lenses 17. Such display devices 16 arranged on the head can be furnished additionally with a recording device 12 by means of which the user can for example take photos and/or videos and which is able to provide the display device 16 with information about the surroundings. For actuation, evaluation and processing of the information of the recording unit 12 or to actuate the display device 16, a computing unit (not shown) can be provided on the frame 14. Further information in the connection can be found for example in the requirements catalog of Google Glass®.

To read in the supplied authentication information 10, a user employs the recording unit 12 of the display device 16 arranged on his head. In case the display device 16 is not furnished with a recording unit 12, the user can also employ the recording unit 12 of a mobile radio device (not shown), in particular of a smartphone and/or tablet PC.

Further, identification information associated with the display device 16 or the mobile radio device (not shown) is transmitted jointly with the read-in authentication information 10. The identification information may be for example a mobile telephone number associated with the display device and/or the mobile radio device, in particular an MSISDN. The user states said information when applying for the cash card 20. If the identification information is an MSISDN, the user states it to the supplying of the authentication information 10.

Alternatively, the identification information associated with the display device 16 or the mobile radio device (not shown) may be the designation of an object, such as a chair, or an animal, such as a duck. Said object is agreed on between the user and the financial institution when the cash card 20 is applied for. The user states said object upon transmission of the identification information associated with the display device 16 or the mobile radio device.

Identification information and read-in authentication information 10 are transmitted to the service facility. If the two match the information stored—in a secure environment—at the service facility, then the confidential information is likewise transmitted via the over-the-air interface to the display device 16. If display device 16 is arranged on a user's head, the confidential information is further displayed on the display device. The service facility may be a mobile network operator (MNO), a financial institution and/or a credit-card company.

Transmission via the over-the-air interface between the display device and the service facility can be effected by means of a mobile radio device (not shown) integrated into the display device or via a mobile telephone coupled with the display device. Coupling between display device 14, 16 and mobile telephone can be effected for example via Bluetooth, infrared and/or wireless LAN. Other radio standards can likewise be employed.

Figure 3:
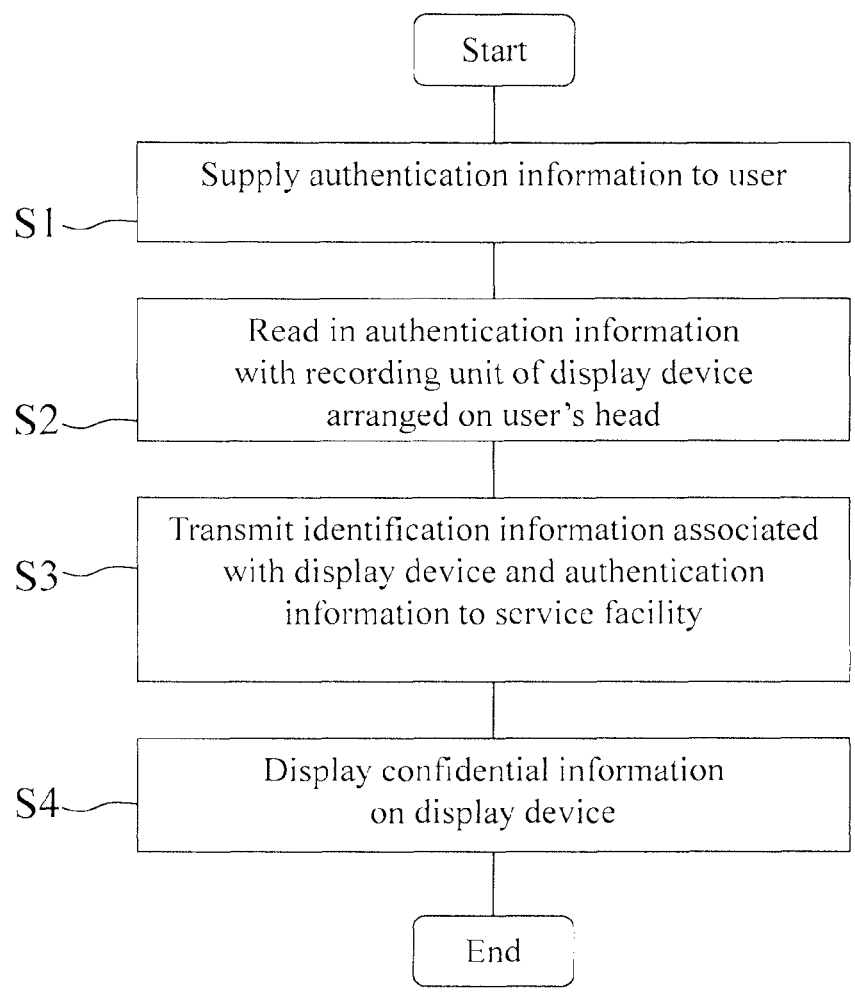

FIG. 3 shows the essential steps S1-S4 of a method according to the invention. Accordingly, authentication information 10 is supplied to a user in a first step S1. This can be effected for example by the authentication information 10 being imprinted on the letter 22 containing the cash card 20. The authentication information 10 can be present in the form of a bar code.

The user reads in the authentication information 10 in a next step S2 with a recording unit 12 of a display device 16 arranged on his head or a recording unit of a mobile radio device (not shown). Upon reading in, if said information is a bar code, the content of the bar code, which can be for example a number, is read out.

Subsequently, identification information associated with the display device 14, 16 or the mobile radio device (not shown) and the read-in authentication information 10 are transmitted to a service facility (step S3). Transmission is effected via an over-the-air interface of the display device or the mobile radio device. The identification information is already known to the service facility before the authentication information 10 is supplied, i.e. before the letter 22 with the cash card 20 is sent to the user.

If the identification information and the read-in authentication information 10 match the information/data deposited at the service facility, the confidential information is transmitted to the display device 16 in a next step S4 and displayed there if the display device 16 is arranged on the user's head.

LIST OF REFERENCE SIGNS

10 Authentication information
12 Recording unit
14 Frame
16 Display device
18 Correspondence
20 Cash card
22 Letter
S1 to S4 Method steps

The invention claimed is:

1. A method for displaying confidential information, having the following steps:
   supplying authentication information to a user by mail;
   reading in the authentication information with a recording unit of a display device arranged on a head or a recording unit of a mobile radio device;
   transmitting identification information associated with the display device arranged on the head or the mobile radio device and the read-in authentication information to a service facility via an over-the-air interface, with the identification information and the read-in authentication information being known to the service facility before the authentication information is supplied;
   transmitting the confidential information to the display device arranged on the head or to the mobile radio device via the over-the-air interface if the identification information and the authentication information match the identification information stored at the service facility and the authentication information, and
   displaying the confidential information on the display device arranged on the head or on the mobile radio device;
   wherein the identification information is information negotiated with the service facility and a mobile telephone number associated with the display device, in particular a Mobile Station International Directory Number (MSISDN); and
   wherein the confidential information is an access password, and/or a cash-card secret code, a debit-card secret code and/or a credit-card secret code.

2. The method according to claim 1, wherein the authentication information is supplied electronically by email, and/or by mail.

3. The method according claim 1, wherein the authentication information is a multi-digit number, and/or an opto-electronically readable code.

4. The method according to claim 1, wherein the recording unit of the display device arranged on the head or the recording unit of the mobile radio device is configured as a camera device.

5. The method according to claim 1, wherein the mobile telephone number is associated with the display device via a mobile telephone coupled with the display device.

6. The method according to claim 5, wherein the display device is coupled with the mobile telephone via short-wavelength UHF radio, infrared and/or wireless LAN.

7. The method according to claim 1, wherein the service facility is a mobile network operator, a financial institution and/or a credit-card company.

8. The method according to claim 1, wherein the display device ascertains, before displaying the confidential information, whether the display device is arranged on a user's head; and
   wherein the display device is prevented from displaying the confidential information until the display device is arranged on the user's head.

9. A method for displaying confidential information, having the following steps:
   supplying authentication information to a user by mail;
   reading in the authentication information with a recording unit of a display device or a recording unit of a mobile radio device;
   transmitting identification information associated with the display device or the mobile radio device and the read-in authentication information to a service facility via an over-the-air interface, with the identification information and the read-in authentication information being known to the service facility before the authentication information is supplied;
   transmitting the confidential information to the display device or to the mobile radio device via the over-the-air interface if the identification information and the authentication information match the identification information stored at the service facility and the authentication information;
   determining whether the display device is mounted on a user's head; and
   displaying the confidential information on the display device arranged on the user's head or on the mobile radio device;
   wherein the display device is prevented from displaying the confidential information until the display device is arranged on the user's head;
   wherein the confidential information is an access password, and/or a cash-card secret code, a debit-card secret code and/or a credit-card secret code.

* * * * *